United States Patent
Binek et al.

(10) Patent No.: US 11,378,038 B2
(45) Date of Patent: Jul. 5, 2022

(54) AXIAL EXPANDABLE EXHAUST DUCT

(71) Applicant: Raytheon Technologies Corporation, Farmington, CT (US)

(72) Inventors: Lawrence A. Binek, Glastonbury, CT (US); Jesse R. Boyer, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 25 days.

(21) Appl. No.: 16/722,726

(22) Filed: Dec. 20, 2019

(65) Prior Publication Data

US 2021/0190006 A1    Jun. 24, 2021

(51) Int. Cl.
| | |
|---|---|
| *F02K 1/80* | (2006.01) |
| *B33Y 80/00* | (2015.01) |
| *B33Y 10/00* | (2015.01) |
| *F02K 1/09* | (2006.01) |
| *F02K 1/08* | (2006.01) |
| *F01N 1/16* | (2006.01) |
| *F01N 13/08* | (2010.01) |

(52) U.S. Cl.
CPC ............... *F02K 1/80* (2013.01); *B33Y 80/00* (2014.12); *B33Y 10/00* (2014.12); *F05D 2220/323* (2013.01); *F05D 2230/31* (2013.01); *F05D 2230/60* (2013.01); *F05D 2240/128* (2013.01)

(58) Field of Classification Search
CPC ... F02K 1/08; F02K 1/80; F02K 1/383; F02K 1/06; B33Y 80/00; B33Y 10/00; B22F 10/40; F01D 25/30; F01D 25/243; F01D 9/023; F05D 2220/323; F05D 2230/31; F05D 2230/60; F05D 2240/128
See application file for complete search history.

(56) References Cited

U.S. PATENT DOCUMENTS

| | | | | |
|---|---|---|---|---|
| 2,402,363 | A | * | 6/1946 | Bradbury ................. F02K 1/08 60/242 |
| 3,853,336 | A | | 12/1974 | Shank |
| 5,038,559 | A | * | 8/1991 | Blackmore ............... F02K 1/08 60/204 |
| 7,194,866 | B1 | | 3/2007 | Jones et al. |
| 8,667,802 | B2 | * | 3/2014 | West ......................... F02K 1/06 60/771 |
| 2009/0136342 | A1 | | 5/2009 | Westlake |
| 2012/0111662 | A1 | | 5/2012 | Casado Abarquero |
| 2018/0045142 | A1 | | 2/2018 | Dierksmeier et al. |
| 2021/0156308 | A1 | * | 5/2021 | Jones ................... F28D 21/0003 |

FOREIGN PATENT DOCUMENTS

DE         19517462 A1     11/1995

OTHER PUBLICATIONS

United Kingdom Search Report for GB Application No. GB2020057.2, dated Apr. 15, 2021, pp. 6.

* cited by examiner

*Primary Examiner* — Eric J Zamora Alvarez
(74) *Attorney, Agent, or Firm* — Getz Balich LLC

(57) ABSTRACT

An exhaust duct for an engine includes an outer exhaust duct and a nested exhaust duct capable of having at least two configurations. The nested exhaust duct is circumferentially surrounded by the outer exhaust duct for a first length of the nested exhaust duct in a first configuration. The nested exhaust duct is circumferentially surrounded by the outer exhaust duct for a second length of the nested exhaust duct in a second configuration, which is less than the first length.

17 Claims, 4 Drawing Sheets

AXIAL EXPANDABLE EXHAUST DUCT

BACKGROUND

The present disclosure relates generally to attritable aircraft engines. More specifically, this disclosure relates to manufacturing of an expandable exhaust duct for an attritable aircraft engine.

Attritable aircraft can include, for example, Unpiloted (or Unmanned) Aerial Vehicles (UAVs) and expendable turbojet systems for guided munitions, missiles, and decoys. Attritable aircraft are generally designed as a limited lifetime vehicle, which can be as short as a single use or single mission vehicle. As such, many components and features common in traditional piloted aircraft are unnecessary or can be simplified for attritable aircraft applications.

For example, an exhaust duct of a traditional aircraft engine can add significant axial length to the engine. Generally, the larger the engine being manufactured the larger the tooling equipment needed for manufacture, increasing the cost of the tooling. Additionally, larger engines can be more expensive to ship from the site of manufacture to an end user. There exist needs in various industries to reduce the size of manufactured parts, thereby reducing manufacturing costs and simplifying packaging.

SUMMARY

An exhaust duct for an engine includes an outer exhaust duct and a nested exhaust duct capable of having at least two configurations. The nested exhaust duct is circumferentially surrounded by the outer exhaust duct for a first length of the nested exhaust duct in a first configuration. The nested exhaust duct is circumferentially surrounded by the outer exhaust duct for a second length of the nested exhaust duct in a second configuration, which is less than the first length.

A method of manufacturing an axially extendable exhaust duct for an engine includes manufacturing an outer exhaust duct and a nested exhaust duct capable of having at least two configurations. The nested exhaust duct is circumferentially surrounded by the outer exhaust duct for a first length of the nested exhaust duct in a first configuration. The nested exhaust duct is circumferentially surrounded by the outer exhaust duct for a second length of the nested exhaust duct in a second configuration, which is less than the first length.

DETAILED DESCRIPTION

An attritable engine with an integrally built extendable exhaust duct is disclosed herein. The attritable engine leverages additive manufacturing techniques to improve various aspects of the limited-life engine. For example, additive manufacturing allows the assembly details to be unitized and, simultaneously permits integration of many complex performance-enhancing features. The additively manufactured engine reduces the time to delivery to the customer and lowers the overall production costs of the unit.

An attritable engine with an integrally built extendable exhaust duct can be assembled into place without any secondary operations, which decouples the axial length of the design build from the size of the build chamber. The extendable exhaust duct can be pulled axially away from the inlet side of the unitized body and locked into place after the build process is complete. Reducing the axial length of the attritable engine during manufacture, decreases the overall build time, reducing costs. Furthermore, the attritable engine prior to extending the exhaust duct has a smaller footprint and, as such, is easier and less expensive to ship.

Figure 1A:
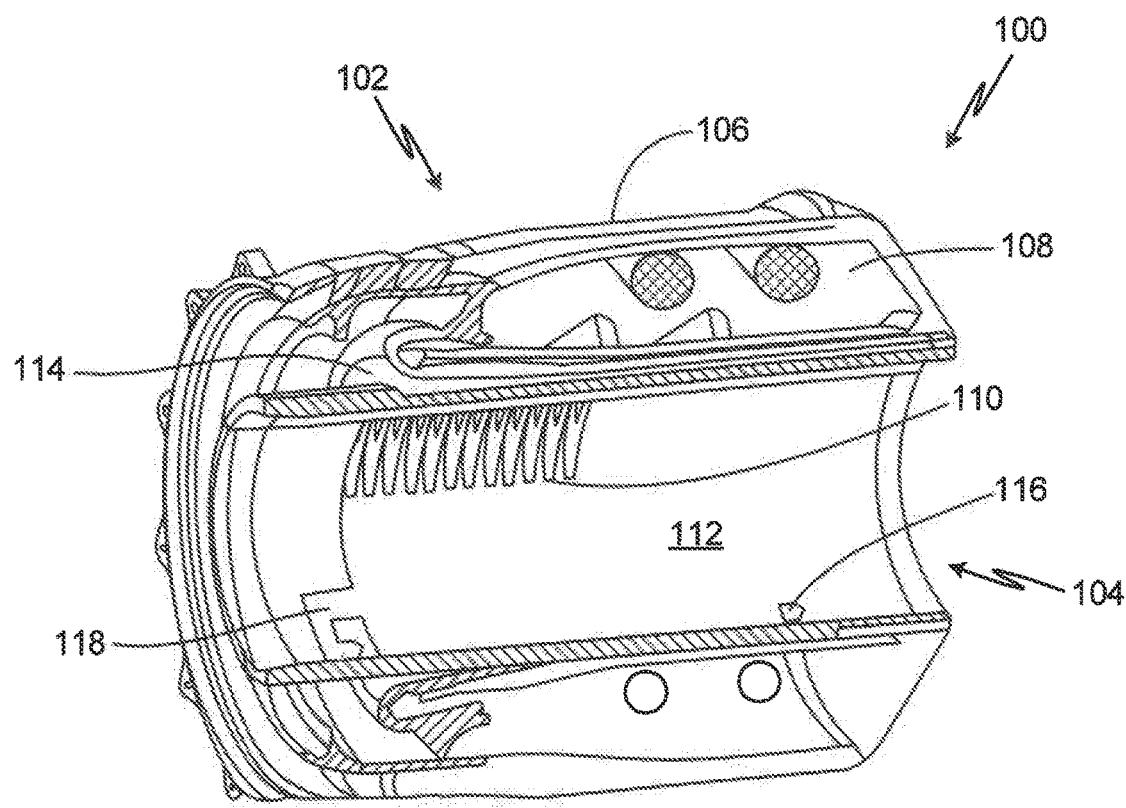
FIGS. 1A and 1B are cross-sectional views of an exhaust duct for an attritable engine in a nested and an expanded state, respectively.
Figure 1B:
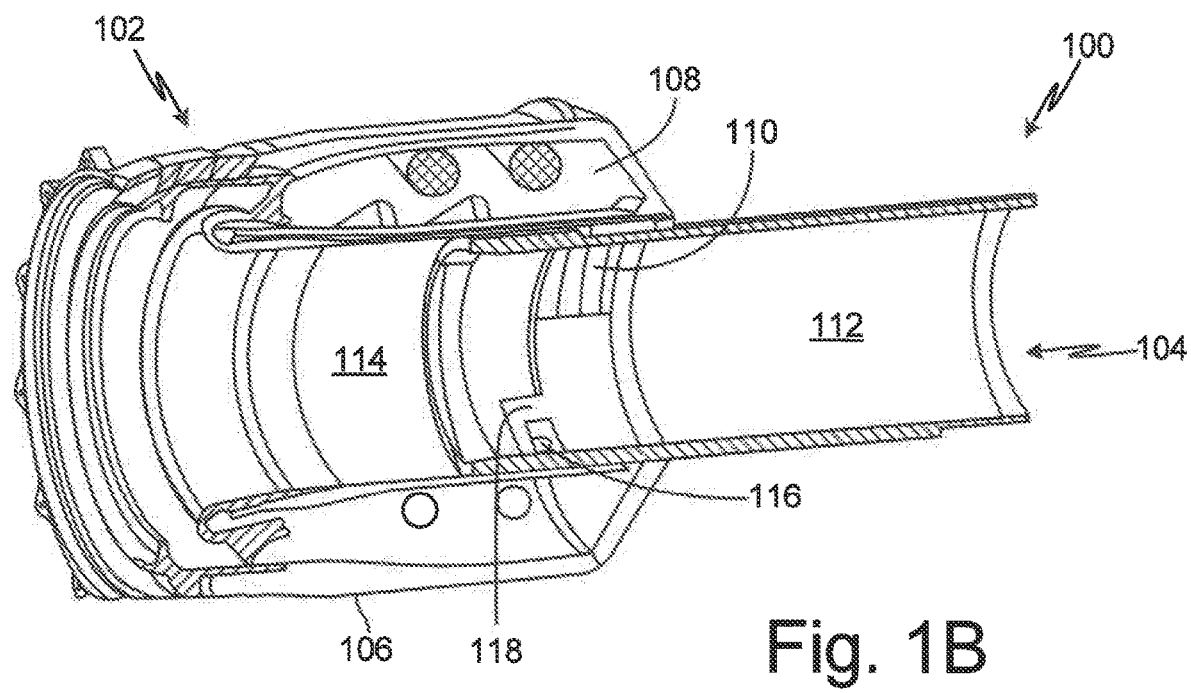

FIGS. 1A and 1B are cross-sectional views of an exhaust duct for an attritable engine in a nested and an expanded state, respectively. FIGS. 1A and 1B will be discussed together. FIGS. 1A and 1B show attritable engine 100 including combustor section 102, exhaust duct section 104, combustor section housing 106, combustor 108, spring 110, nested exhaust duct 112, outer exhaust duct 114, key 116, and keyway 118.

Combustor section 102 of attritable engine 100 circumferentially surrounds exhaust duct section 104, and includes combustor section housing 106 that encases spaced apart combustors 108. Exhaust duct section 104 includes spring 110 attached to nested exhaust duct 112. As depicted in FIG. 1A, spring 110 is in an uncompressed state and can be seen through a phantom line drawing of nested exhaust duct 112. Key 116 is attached to outer exhaust duct 114 and can also be seen through phantom line drawing of nested exhaust duct 112. Keyway 118 is part of and lies on the external surface of nested exhaust duct 112 and, as such, is also shown as a phantom line drawing.

Operationally, after the build process is complete, nested exhaust duct 112 is extended axially away from combustor section housing 106. Spring 110 is compressed as nested exhaust duct 112 is extended until key 116 of outer exhaust duct 114 enters and contacts the bottom of keyway 118 of nested exhaust duct 112 such that nested exhaust duct 112 does not extend further. Nested exhaust duct 112 is rotated relative to outer exhaust duct 114 and key 116 travels circumferentially around and through keyway 118 until nested exhaust duct 112 does not rotate further. Compressed spring 110 is allowed to push nested exhaust duct 112 axially toward combustor section housing 106 until key 116 of outer exhaust duct 114 is engaged and firmly seated within keyway 118 of nested exhaust duct 112.

In one embodiment, the total axial length of attritable engine 100 is 11 inches (27.9 cm) in the nested state and 21 inches (53.3 cm) in an extended state. In other embodiments, the total axial length of attritable engine 100 is from 8 inches (20.3 cm) to 14 inches (35.6 cm), inclusive in the nested state and from 18 inches (45.7 cm) to 24 inches (61 cm), inclusive in an extended state. In other embodiments, the total axial length of attritable engine 100 is less than 8 inches (20.3 cm) in the nested state and less than 18 inches (45.7 cm) in an extended state. In other embodiments, the total axial length of attritable engine 100 is more than 14 inches (35.6 cm) in the nested state and more than 24 inches (61 cm) in an extended state.

As depicted in FIG. 1B, spring 110 is in a compressed state and nested exhaust duct 112 (drawn in phantom) is in an axially extended state. Key 116 of outer exhaust duct 114 is engaged in keyway 118 of nested exhaust duct 112. Compressed spring 110 helps to keep key 116 engaged in keyway 118 throughout the operation of attritable engine 100, which may experience various forces under load such as, for example, vibrational, thermal, and shock.

Attritable engine 100 including exhaust duct section 104 can be additively manufactured using any metal or alloy that can tolerate the high temperature and pressure environment of a gas turbine engine for the expected useable life of the vehicle, such as, for example, Inconel® 625 or other nickel alloys including alloys of nickel, chromium, and iron. However, guided munitions, missiles, and decoys are designed as single use vehicles and can have a maximum useable life of 10 hours. Heat protection that extends the useable life of the vehicle beyond 10 hours can unnecessarily add labor and expense to the manufacturing of such an engine. On the other hand, some UAVs can be designed to perform multiple missions and more heat protection may be desirable. A specific metal or alloy with or without additional treatments to provide heat protection can be chosen with such considerations in mind. For example, a thermal barrier layer or coating can be applied to the metal or alloy to extend the useful life of the attritable engine.

Figure 2A:
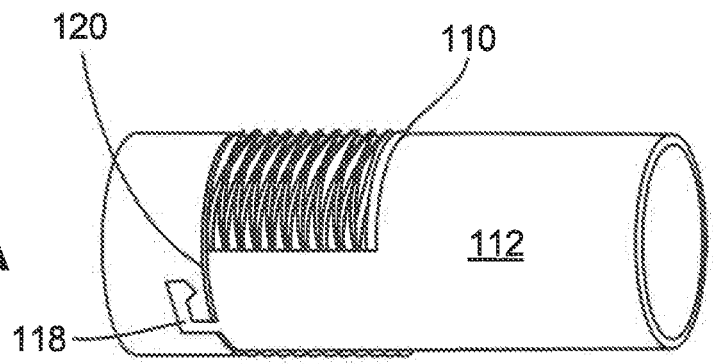
FIGS. 2A and 2B are perspective views of the inner section of the exhaust duct showing springs in an uncompressed and a compressed state, respectively.
Figure 2B:
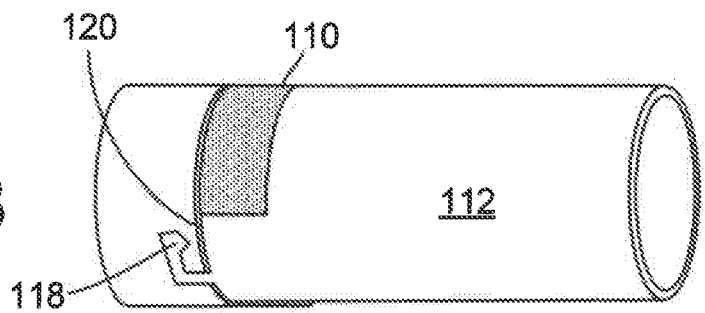

FIGS. 2A and 2B are perspective views of the inner section of the exhaust duct showing springs in an uncompressed and a compressed state, respectively. FIGS. 2A and 2B will be discussed together. FIGS. 2A and 2B show spring 110, nested exhaust duct 112, keyway 118, and nested lip 120. Nested exhaust duct 112 includes spring 110 and keyway 114. Nested exhaust duct 112 sits inside of outer exhaust duct during the manufacturing process.

Spring 110 is attached to nested lip 120 and is circumferentially conformal with nested exhaust duct 112. As depicted in FIG. 2A, spring 110 is in an uncompressed state during the manufacturing process. As depicted in FIG. 2B, spring 110 is in a compressed state during operation of attritable engine 100. Spring 110 is able to slide along nested exhaust duct 112, but remains circumferentially conformal with nested exhaust duct 112 and remains attached to nested lip 120.

Keyway 118 of nested exhaust duct 112 extends through nested lip 120. Although keyway 118 is depicted in FIGS. 2A and 2B as having a shape similar to the letter j, keyway 118 can have any shape that allows a key to travel through nested lip 120 and, with the help of compressed spring 110, retain the key in an engaged state within keyway 118 during operation of attritable engine 100.

Figure 3A:
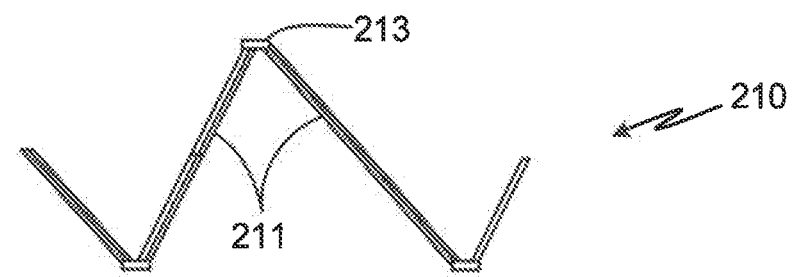
FIG. 3A is a perspective view of one embodiment of the spring.

FIG. 3A is a perspective view of one embodiment of the spring. FIG. 3A shows spring 210 including rods 211 and angular joints 213. Rods 211 provide structure to spring 210 and ensure conformability of spring 210 with a nested exhaust duct. On the one hand, angular joints 213 provide an elongated structure to spring 210 when in an uncompressed state. On the other hand, angular joints 213 provide a shortened structure to spring 210 when in a compressed state and provide a compressive force to retain a key in a keyway during operation of an attritable engine.

Figure 3B:
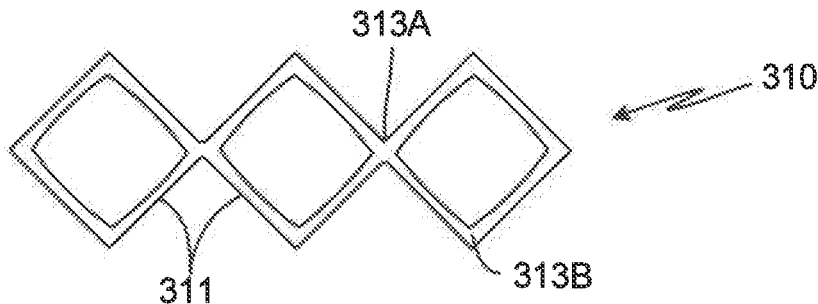
FIG. 3B is a perspective view of one embodiment of the spring.

FIG. 3B is a perspective view of one embodiment of the spring. FIG. 3B shows spring 310 including rods 311 and angular joints 313A and 313B. Rods 311 provide structure to spring 310 and ensure conformability of spring 310 with a nested exhaust duct. On the one hand, angular joints 313A and 313B provide an elongated structure to spring 310 when in an uncompressed state. On the other hand, angular joints 313A and 313B provide a shortened structure to spring 310 when in a compressed state and, as such, provide a compressive force to retain a key in a keyway during operation of an attritable engine.

In one embodiment, springs 110, 210, and 310 can have a radial width from 0.01 inches (0.25 mm) to 0.05 inches (1.27 mm), inclusive. In other embodiments, springs 110, 210, and 310 can have a radial width larger than 0.05 inches (1.27 mm). The springs can have many different geometries and configurations. Some of the factors considered when designing the springs include, but are not limited to, the size of the engine, the compressive force necessary to retain the nested exhaust duct in an extended state during operation of the engine, the dimensions required to withstand the compressive forces such that the springs do not break, the radial distance between the nested exhaust duct and the outer exhaust duct, the ability of the springs to be compressed and slide within the radial distance between the nested exhaust duct and the outer exhaust duct, and other forces experienced during operation of the engine such as, vibrations and thermal stress.

Figure 4A:
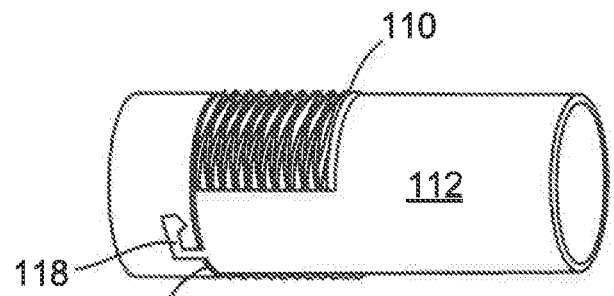
FIG. 4A is a perspective view of the nested exhaust duct including the uncompressed spring.
Figure 4B:
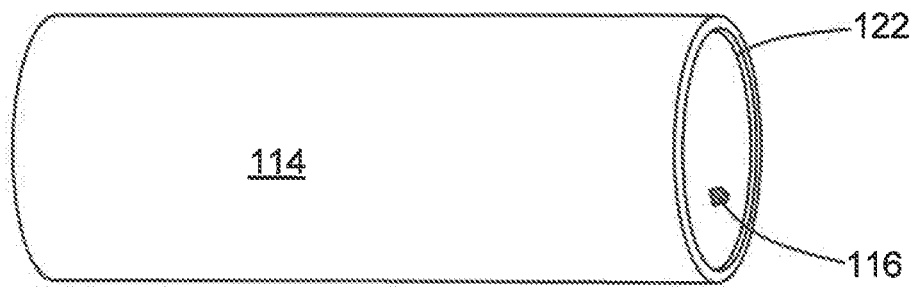
FIG. 4B is a perspective view of the outer exhaust duct including the key.

FIG. 4A is a perspective view of the nested exhaust duct including the uncompressed spring. The description and parts of FIG. 4A is the same as that of FIG. 2A. FIG. 4B is a perspective view of the outer exhaust duct including the key. FIG. 4B shows outer exhaust duct 114 including key 116 and arresting face 122. Key 116 is attached to the inner surface of outer exhaust duct 114. Although key 116 is depicted as having a pentagon shape in FIG. 4B, key 116 can be any size or shape which allows the nested exhaust to be axially extended and retained within a keyway, with the help of the compressed spring, during operation of an attritable engine. Arresting face 122 has a smaller inner diameter than the rest of outer exhaust duct 114 and provides a surface for a spring to contact and be compressed as nested exhaust duct is extended in an axial direction. Arresting face 122 also provides a surface, against which, a compressed spring can generate a compressive force to retain key 116 in a keyway during operation of an attritable engine.

Figure 4C:
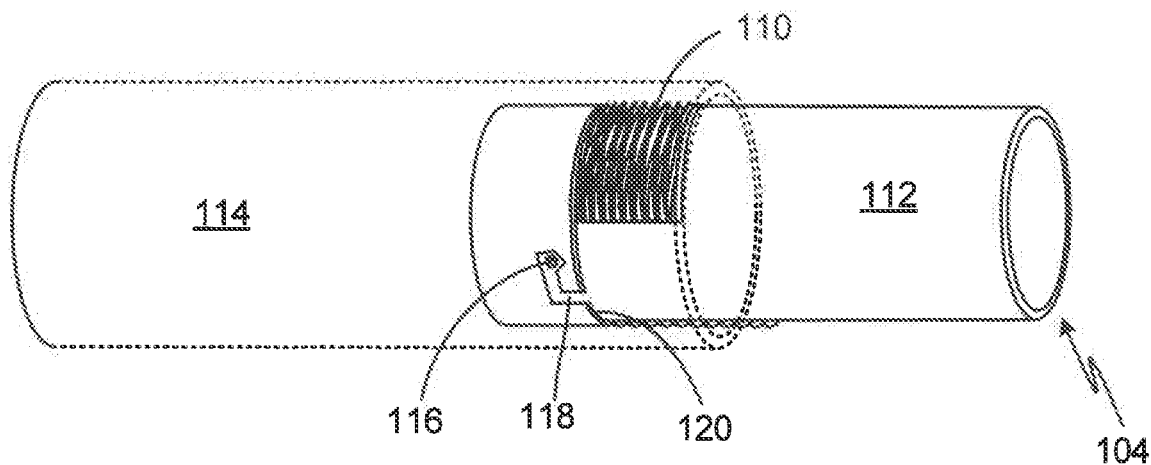
FIG. 4C is a perspective view of the expanded exhaust duct positioned in an extended state inside the outer exhaust duct.

FIG. 4C is a perspective view of the expanded exhaust duct positioned in an extended state inside the outer exhaust duct. FIG. 4C shows exhaust duct section 104 including spring 110, nested exhaust duct 112, outer exhaust duct 114, key 116, keyway 118, and nested lip 120. Outer exhaust duct 114 is depicted with phantom lines. Nested exhaust duct 112 is in an extended state.

Figure 5:
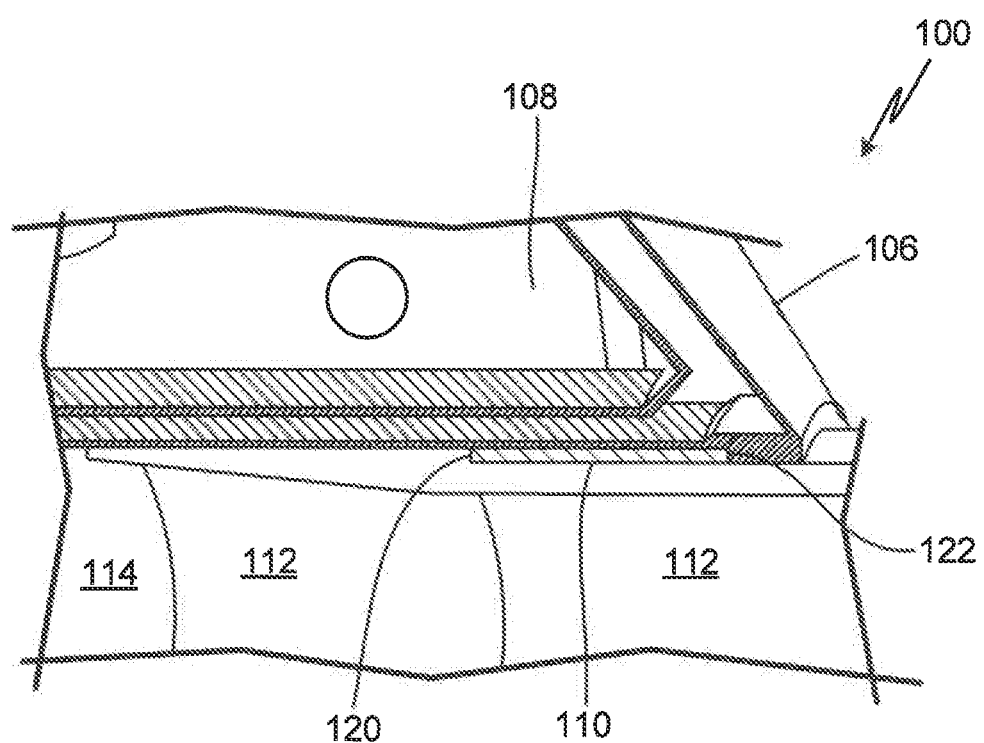
FIG. 5 is a cross-sectional view of the nested exhaust duct in an extended state including the compressed spring.

Spring 110 is in a compressed state and is attached to nested lip 120 and in contact with arresting face 122 (shown in FIG. 5). Spring 110 provides a compressive force against arresting face 122 to retain key 116 in keyway 118 during operation of an attritable engine. Spring 110 does not completely circumscribe nested exhaust duct 112. At least a gap large enough to allow key 116 to slide into keyway 118 without contacting spring 110 is present. More than one spring can be present, which provides not only an unobstructed path for key 116 to travel, but also can provide a way to simply engineer an even weight and compressive force distribution around nested exhaust duct 112. Non-symmetrical alignment of the nested exhaust duct within the outer exhaust duct may cause the attritable engine to run less efficiently or fail prematurely.

FIG. 5 is a cross-sectional view of the nested exhaust duct in an extended state including the compressed spring. FIG. 5 shows attritable engine 100 including combustor section housing 106, combustor 108, spring 110, nested exhaust duct 112, outer exhaust duct 114, nested lip 120, and arresting face 122. Combustor section housing 106 encases spaced apart combustors 108, which circumscribes spaced apart outer exhaust duct 114. Nested exhaust duct 112 resides inside outer exhaust duct 114. As depicted in FIG. 5, nested exhaust duct 112 is in an extended configuration and spring 110 is in a compressed state. Spring 110 is attached to nested lip 120 of nested exhaust duct 112 and is in contact with arresting face 122 of outer exhaust duct 114.

Both nested lip 120 and arresting face 122 extend in opposite radial directions from nested exhaust duct and outer exhaust duct, respectively and come in close contact with the other opposing exhaust duct surface. In other words, nested lip 120 comes in close contact with the inner surface of outer exhaust duct 114 and arresting face 122 comes in close contact with the outer surface of nested exhaust duct 112 and prevents key 116 from disengaging from keyway 118 during operation of attritable engine 100. However, nested lip 120 and arresting face 122 are not so close as to prevent nested exhaust duct 112 to be extended in an axial direction and rotated relative to outer exhaust duct 114. In one embodiment, nested lip 120 and arresting face 122 extend a distance from nested exhaust duct and outer exhaust duct, respectively, from 0.1 inches (2.54 mm) to 0.25 inches (6.35 mm), inclusive.

An exhaust duct with multiple nested exhaust ducts is also contemplated, herein. Each additional nested exhaust duct would have a key on its inner surface and a keyway on its external surface and a spring to help lock each section in place. Such a system can be described as having telescoping capabilities.

Using additive manufacturing techniques, an attritable engine can be built with an integrally extendable exhaust duct, which can be assembled into place without any secondary operations. The nested exhaust duct is pulled axially away from the inlet side of the unitized body and is locked into place after the build process is complete. Building the attritable engine with an integrally extendable exhaust duct decouples the axial length of the design build from the size of the build chamber. Reducing the axial length of the attritable engine during manufacture, decreases the overall build time and the size of the build chamber, reducing costs. Furthermore, the attritable engine prior to extending the exhaust duct has a smaller footprint and, as such, is easier and less expensive to ship. The exhaust duct in an extended configuration is also more prone to damage such as, for example, dents, during handling and shipping.

Discussion of Possible Embodiments

The following are non-exclusive descriptions of possible embodiments of the present invention.

An exhaust duct for an engine includes an outer exhaust duct and a nested exhaust duct capable of having at least two configurations. The nested exhaust duct is circumferentially surrounded by the outer exhaust duct for a first length of the nested exhaust duct in a first configuration. The nested exhaust duct is circumferentially surrounded by the outer exhaust duct for a second length of the nested exhaust duct in a second configuration, which is less than the first length.

The exhaust duct of the preceding paragraph can optionally include, additionally and/or alternatively, any one or more of the following features, configurations and/or additional components:

The exhaust duct includes an integrally formed key on an interior surface of the outer exhaust duct.

The exhaust duct includes an integrally formed keyway on an exterior surface of the nested exhaust duct.

The integrally formed key is located away from the integrally formed keyway in the first configuration and wherein the integrally formed key is located within the integrally formed keyway in the second configuration.

The exhaust duct includes an integrally formed nested lip on an exterior surface of the nested exhaust duct.

The exhaust duct includes a spring attached to the nested lip and circumferentially conformal with the nested exhaust duct.

The spring is uncompressed in the first configuration and the spring is compressed in the second configuration.

The compressed spring is configured to exert a compressive force in order to retain the key within the keyway during operation of the engine.

The exhaust duct includes an integrally formed arresting face on an interior surface of the outer exhaust duct.

The integrally formed arresting face is located away from the spring in the first configuration and the integrally formed arresting face is in contact with the spring in the second configuration.

The first length is substantially equal to the axial length of the nested exhaust duct.

A method of manufacturing an axially extendable exhaust duct for an engine includes manufacturing an outer exhaust duct and a nested exhaust duct capable of having at least two configurations. The nested exhaust duct is circumferentially surrounded by the outer exhaust duct for a first length of the nested exhaust duct in a first configuration. The nested exhaust duct is circumferentially surrounded by the outer exhaust duct for a second length of the nested exhaust duct in a second configuration, which is less than the first length.

The method of the preceding paragraph can optionally include, additionally and/or alternatively, any one or more of the following features, configurations and/or additional components:

The method includes manufacturing an integrally formed key on an interior surface of the outer exhaust duct and an integrally formed keyway on an exterior surface of the nested exhaust duct.

The integrally formed key is located away from the integrally formed keyway in the first configuration and the integrally formed key is located within the integrally formed keyway in the second configuration.

The method includes manufacturing an integrally formed nested lip on an exterior surface of the nested exhaust duct, a spring attached to the nested lip and circumferentially conformal with the nested exhaust duct, and an integrally formed arresting face on an interior surface of the outer exhaust duct.

The spring is uncompressed and the integrally formed arresting face is located away from the spring in the first configuration and the spring is compressed and the integrally formed arresting face is in contact with the spring in the second configuration.

The compressed spring is configured to exert a compressive force in order to retain the key within the keyway during operation of the engine.

The method includes extending the nested exhaust duct in a first configuration in an axial direction, rotating the nested exhaust duct relative to the outer exhaust duct, and allowing the spring to exert a compressive force to retain the key within the keyway.

Manufacturing is performed using additive manufacturing techniques.

An axially extendable exhaust duct for an engine includes an outer exhaust duct having an integrally formed key on an interior surface of the outer exhaust duct and a nested exhaust duct with an integrally formed keyway on an exterior surface of the nested exhaust duct, which is capable of having at least two configurations. The nested exhaust duct is circumferentially surrounded by the outer exhaust duct for a first length of the nested exhaust duct in a first configuration and the nested exhaust duct is circumferentially surrounded by the outer exhaust duct for a second length of the nested exhaust duct in a second configuration, which is less than the first length. The exhaust duct also includes a spring attached to and circumferentially conformal with the nested exhaust duct. The spring is uncompressed in the first configuration and the spring is compressed in the second configuration and configured to exert a compressive force in order to retain the key within the keyway during operation of the engine.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An exhaust duct for an engine, the exhaust duct comprising:
    an outer exhaust duct;
    a nested exhaust duct capable of having at least two configurations, wherein the nested exhaust duct is circumferentially surrounded by the outer exhaust duct for a first length of the nested exhaust duct in a first configuration and wherein the nested exhaust duct is circumferentially surrounded by the outer exhaust duct for a second length of the nested exhaust duct in a second configuration, wherein the second length is less than the first length;
    an integrally formed key; and
    an integrally formed keyway;
    wherein the integrally formed key is located away from the integrally formed keyway in the first configuration, the integrally formed key is located within the integrally formed keyway in the second configuration, and one of the integrally formed key and the integrally formed keyway is on an interior surface of the outer exhaust duct.

2. The exhaust duct of claim 1, wherein the integrally formed key is on the interior surface of the outer exhaust duct.

3. The exhaust duct of claim 2, wherein the integrally formed keyway is on an exterior surface of the nested exhaust duct.

4. The exhaust duct of claim 1 and further comprising an integrally formed nested lip on an exterior surface of the nested exhaust duct.

5. The exhaust duct of claim 4 and further comprising a spring attached to the nested lip and circumferentially conformal with the nested exhaust duct.

6. The exhaust duct of claim 5, wherein the spring is uncompressed in the first configuration and wherein the spring is compressed in the second configuration.

7. The exhaust duct of claim 6, wherein the compressed spring is configured to exert a compressive force in order to retain the key within the keyway during operation of the engine.

8. The exhaust duct of claim 7 and further comprising an integrally formed arresting face on the interior surface of the outer exhaust duct.

9. The exhaust duct of claim 8, wherein the integrally formed arresting face is located away from the spring in the first configuration and wherein the integrally formed arresting face is in contact with the spring in the second configuration.

10. The exhaust duct of claim 1, wherein the first length is equal to an axial length of the nested exhaust duct.

11. A method of manufacturing an axially extendable exhaust duct for an engine, the method comprising:
    manufacturing an outer exhaust duct;
    manufacturing a nested exhaust duct capable of having at least two configurations, wherein the nested exhaust duct is circumferentially surrounded by the outer exhaust duct for a first length of the nested exhaust duct in a first configuration and wherein the nested exhaust duct is circumferentially surrounded by the outer exhaust duct for a second length of the nested exhaust duct in a second configuration, wherein the second length is less than the first length; and
    manufacturing an integrally formed key and an integrally formed keyway;
    wherein the integrally formed key is located away from the integrally formed keyway in the first configuration, the integrally formed key is located within the integrally formed keyway in the second configuration, and one of the integrally formed key and the integrally formed keyway is on an interior surface of the outer exhaust duct.

12. The method of claim 11, wherein the integrally formed key is on the interior surface of the outer exhaust duct and the integrally formed keyway is on an exterior surface of the nested exhaust duct.

13. The method of claim 11 and further comprising manufacturing an integrally formed nested lip on an exterior surface of the nested exhaust duct, a spring attached to the nested lip and circumferentially conformal with the nested exhaust duct, and an integrally formed arresting face on the interior surface of the outer exhaust duct.

14. The method of claim 13, wherein the spring is uncompressed and the integrally formed arresting face is located away from the spring in the first configuration and wherein the spring is compressed and the integrally formed arresting face is in contact with the spring in the second configuration.

15. The method of claim 14, wherein the compressed spring is configured to exert a compressive force in order to retain the key within the keyway during operation of the engine.

16. The method of claim 15 and further comprising:
    extending the nested exhaust duct in the first configuration in an axial direction;
    rotating the nested exhaust duct relative to the outer exhaust duct; and allowing the spring to exert the compressive force to retain the key within the keyway.

17. An axially extendable exhaust duct for an engine, the exhaust duct comprising:
an outer exhaust duct having an integrally formed key on an interior surface of the outer exhaust duct;
a nested exhaust duct with an integrally formed keyway on an exterior surface of the nested exhaust duct, which is capable of having at least two configurations, wherein the nested exhaust duct is circumferentially surrounded by the outer exhaust duct for a first length of the nested exhaust duct in a first configuration and wherein the nested exhaust duct is circumferentially surrounded by the outer exhaust duct for a second length of the nested exhaust duct in a second configuration, wherein the second length is less than the first length; and
a spring attached to and circumferentially conformal with the nested exhaust duct, wherein the spring is uncompressed in the first configuration and wherein the spring is compressed in the second configuration and configured to exert a compressive force in order to retain the key within the keyway during operation of the engine.

* * * * *